(12) United States Patent
Debergh

(10) Patent No.: US 6,656,405 B1
(45) Date of Patent: Dec. 2, 2003

(54) METHOD FOR FABRICATING REINFORCED DRAIN COVERS

(76) Inventor: Ludo Debergh, Spelverstraat 11A., 3740 Bilzen. (BE)

( * ) Notice: Subject to any disclaimer, the term of this patent is extended or adjusted under 35 U.S.C. 154(b) by 0 days.

(21) Appl. No.: 09/581,190

(22) PCT Filed: Dec. 8, 1998

(86) PCT No.: PCT/BE98/00195

§ 371 (c)(1),
(2), (4) Date: Jun. 16, 2000

(87) PCT Pub. No.: WO99/32274

PCT Pub. Date: Jul. 1, 1999

(30) Foreign Application Priority Data

Dec. 18, 1997 (BE) .......................................... 09701038

(51) Int. Cl.⁷ .......................... B29C 70/48; B29D 28/00
(52) U.S. Cl. ...................... 264/258; 264/261; 264/263; 264/271.1; 264/279.1; 264/275; 428/114
(58) Field of Search ................................ 264/257, 258, 264/263, 275, 261, 271.1, 225.1; 428/114

(56) References Cited

U.S. PATENT DOCUMENTS

| | | | | |
|---|---|---|---|---|
| 2,566,817 A | * | 9/1951 | Yellin ........................ 264/257 |
| 3,678,147 A | * | 7/1972 | Patchen ...................... 264/325 |
| 4,028,460 A | * | 6/1977 | Meyer ........................ 264/257 |
| 4,382,056 A | * | 5/1983 | Coonrod ...................... 264/137 |
| 4,664,862 A | * | 5/1987 | Ghavamikia ................ 264/257 |
| 5,074,950 A | * | 12/1991 | Myers ........................ 156/433 |
| 5,364,584 A | * | 11/1994 | Imanara et al. ............. 264/510 |
| 5,439,627 A | * | 8/1995 | De Jager .................... 264/129 |
| 5,529,431 A | * | 6/1996 | Walsh ......................... 404/25 |
| 5,855,984 A | * | 1/1999 | Newton ...................... 428/118 |

FOREIGN PATENT DOCUMENTS

| | | |
|---|---|---|
| EP | 0 560 038 A1 * | 9/1993 |
| JP | 09-209497 * | 8/1997 |

* cited by examiner

*Primary Examiner*—Stefan Staicovici
(74) *Attorney, Agent, or Firm*—Bacon & Thomas, PLLC

(57) ABSTRACT

A method of fabricating a solid drain cover wherein a plurality of reinforcement layers are inserted into a mold cavity and an unhardened polymer is injected into the mold cavity to surround the reinforcement layers. Each of the reinforcement layers includes a plurality of fiber strands positioned to extend across the mold cavity and are spaced by a predetermined distance. The reinforcement layers are attached to at least one layered spacer which is interposed between adjacent reinforcement layers. The drain cover is produced when the polymer has hardened in the mold cavity with the reinforcement layers and layered spacers embedded therein.

23 Claims, 6 Drawing Sheets fig. 9
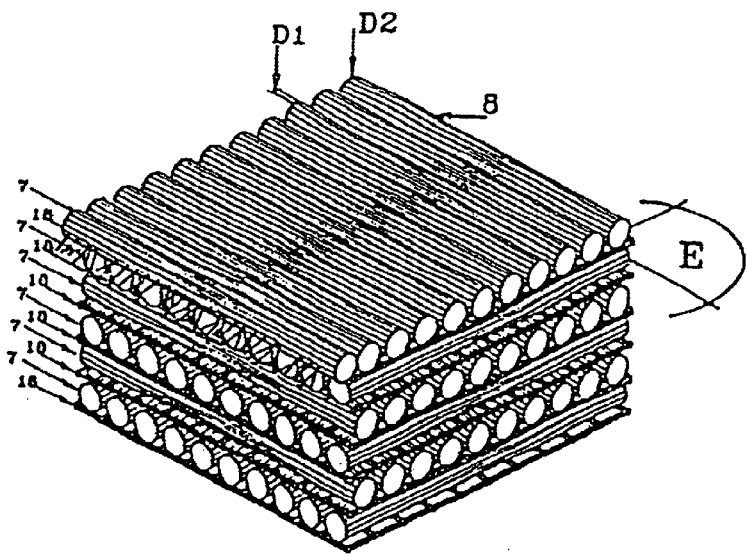
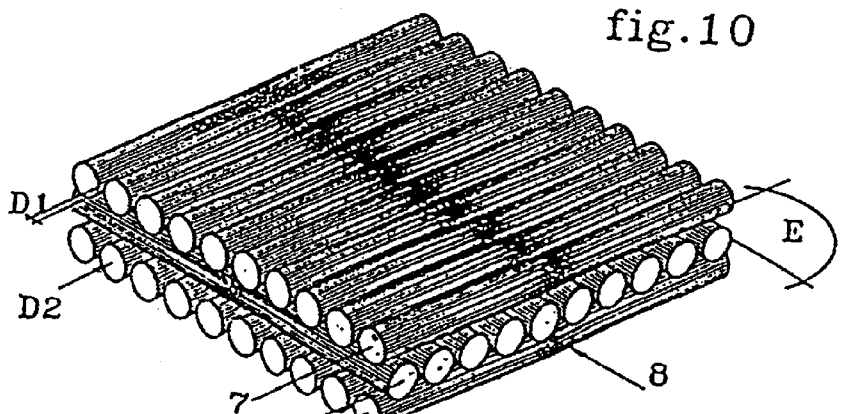
fig. 10
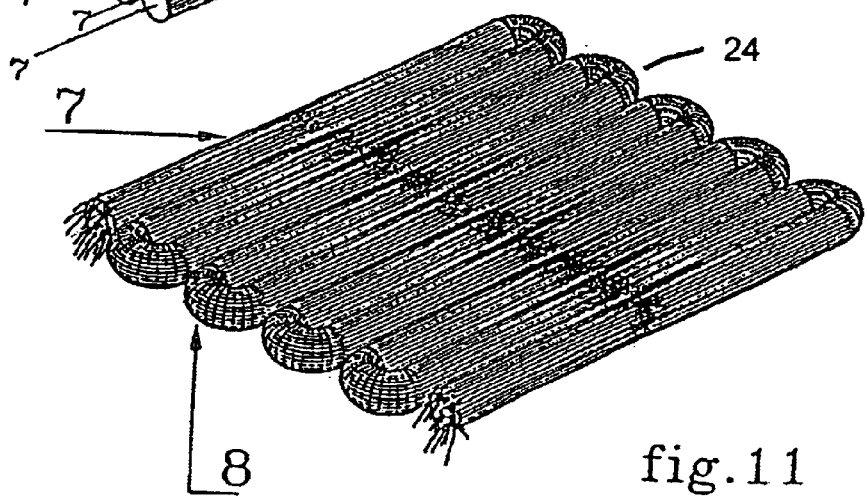
fig. 11

METHOD FOR FABRICATING REINFORCED DRAIN COVERS

This invention concerns a process for fabricating a reinforced drain cover and reinforced drain covers obtained using this process.

In particular the invention concerns a process for fabricating reinforced drain covers out of plastic.

The purpose of the invention is to provide a process that allows the fabricating of reinforced drain covers that are maximally resistant to warping due to heavy loads, i.e., that ensures that the final product is optimally stabile.

An additional goal of the invention consists in providing reinforced drain covers capable of handling very large loads, for example sewer covers with a diameter of 800 mm capable of handling 40 tons or more.

The invention provides a process of fabricating reinforced drain covers, characterised by the insertion into a mould of number of layers of reinforcement made up of strands of fibre with a predetermined diameter that in turn are made up of interwoven fibres, and lying between these, also in layers, horizontal and vertical spacers, preferably more rigid than the reinforcing fibres; filling the mould with plastic such that all fibres visible at the external perimeter come maximally into contact with the plastic, this by covering the fibre strands on all sides with a plastic layer of a predetermined thickness, and after the hardening of the plastic, removing of now complete reinforced drain covers.

By using the aforementioned structure, as will be seen in more detail below, a balance is provided that allows the reinforced drain cover, after removal from the mould, cooling and the shrinkage caused by such, to meet the stated requirements concerning flatness, shape and The aforementioned mould is preferably filled with plastic by means of the so-called RIM procedure (Reaction Injection Moulding). With this procedure the plastic enters the mould relatively slowly which offers the advantage, according to the invention, that the reinforcement and the spacers are not subjected to brusque forces which eliminates the risk that they would shift.

The invention also concerns a reinforced drain cover that is fabricated according to the aforementioned process.

With the intent to better demonstrate the invention, some preferred ways of implementation are described below as examples, without them being in any way limiting, with reference to the associated drawings, in which.

FIGS. 9, 10, and 11 depict a perspective image of how, for example, one can form layers of reinforcement and can arrange layers of reinforcements with spacers.

Figure 1:
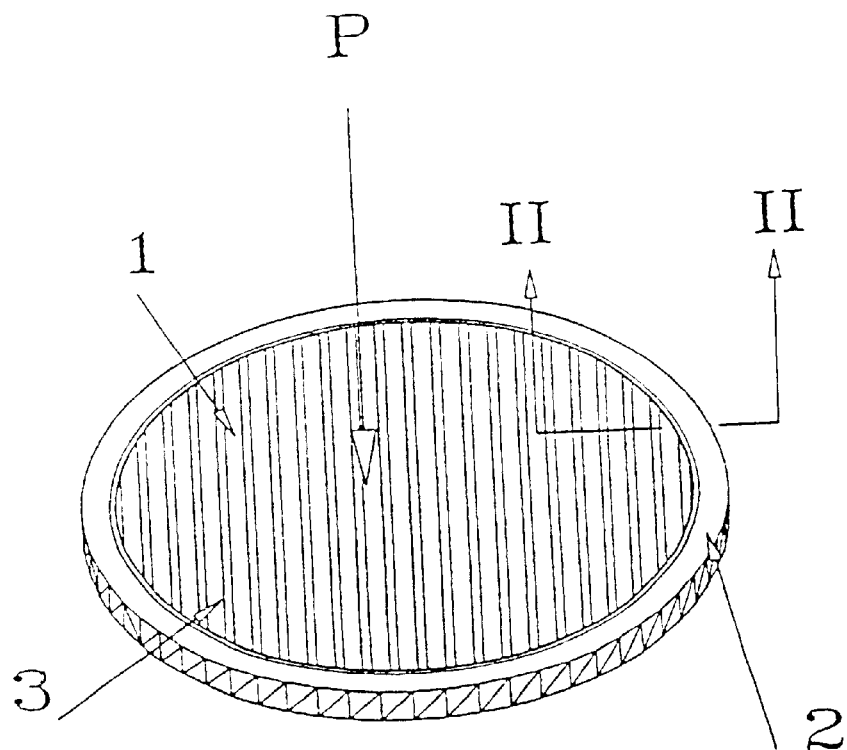
FIG. 1 depicts a drain cover made according to the invention.
Figure 2:
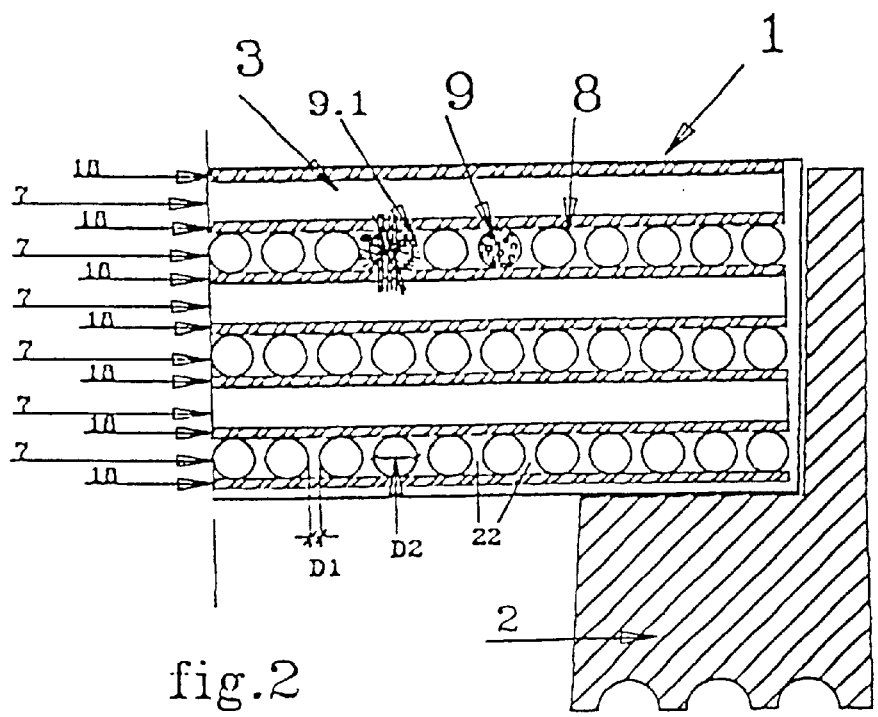
FIG. 2 depicts a larger scale and cross-section of line II—II in FIG. 1.

The invention, as already mentioned concerns a process for the fabrication of a drain cover (1) out of plastic, examples of which are depicted in FIGS. 1 and 2. The drain cover (1) can be inserted in an appropriate frame (2) which preferably is also made of plastic.

In the example shown, a drain cover (1) is depicted that consists of a primarily flat body (3). However, it is clear that the process described below is not limited to such drain covers (1), but can also be applied to other shapes of drain covers or slabs, for example, drain covers or slabs with an underlying structures.

Figure 3:
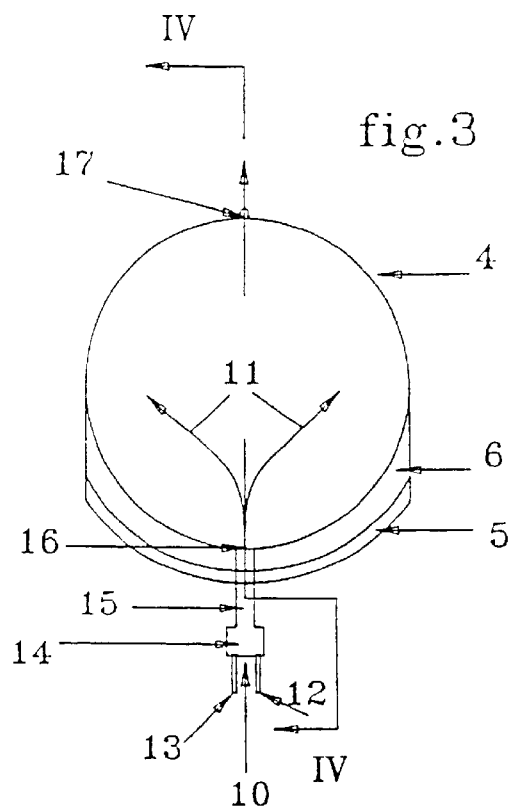
FIG. 3 depicts a mould for the fabricating of the drain cover in FIG. 1.
Figure 4:
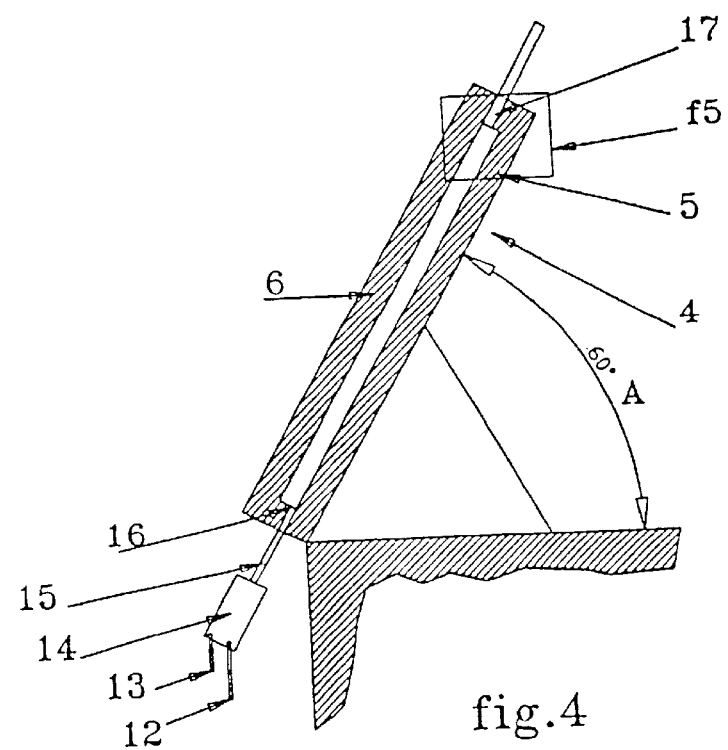
FIG. 4 depicts a larger scale and cross-section of line IV—IV in FIG. 3.
Figure 5:
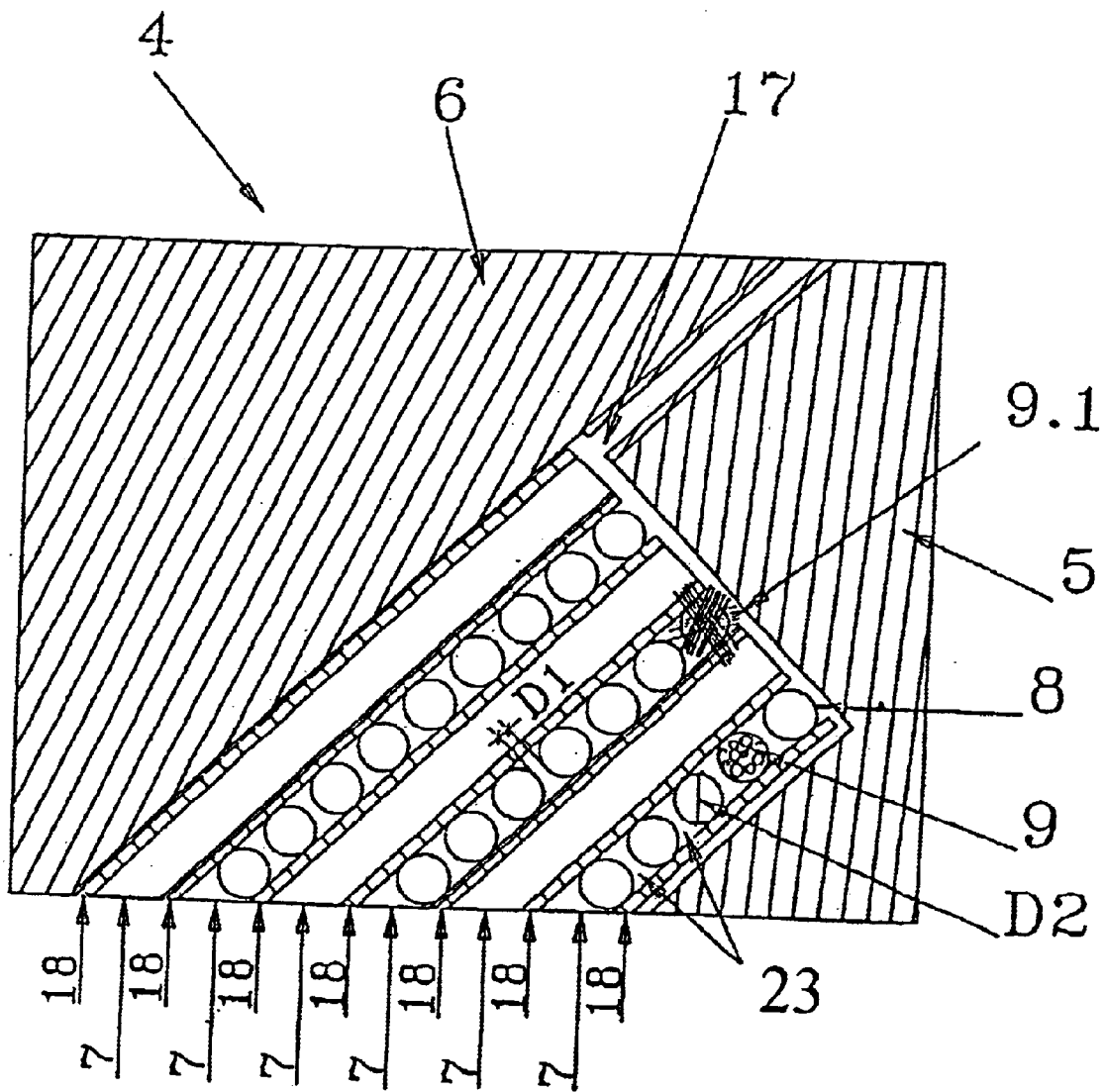
FIG. 5 depicts a larger scale view of the part that is indicated in FIG. 4, which indicates the various layers that are put into the mould before filling it.
Figure 8:
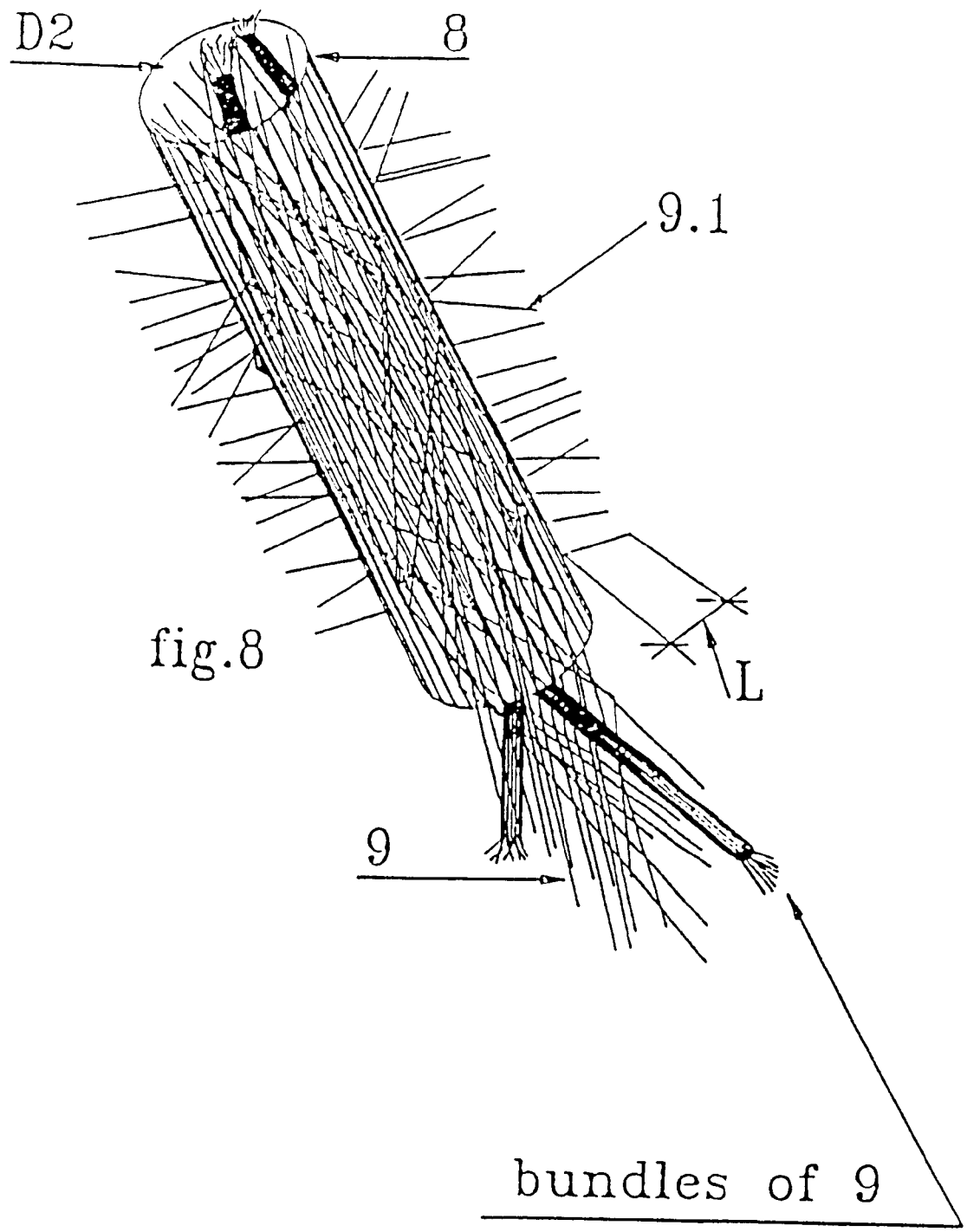
FIG. 8 depicts part of a fibre strand that is used as reinforcement for the drain cover in in FIG. 1.

The process used to fabricate the drain cover (1) consists of, as depicted in FIGS. 3 and 4, a mould (4) that can consist of multiple mould parts (5 and 6); that, as depicted in FIG. 5, into the mould (4) are inserted, crosswise, a number of reinforcement layers (7) made up of fibre strands (8), constructed as depicted in FIG. 8, that have a predetermined diameter (D2), that run parallel and at a certain distance from each other (D1), kept from each other with spacers (18) so that subsequently when the mould (4) is filled with liquid plastic (11) schematically depicted by the arrow (10) in FIG. 3, all fibres (9 and 9.1) that appear at the exterior perimeter (7) are maximally bonded with the liquid plastic (11) to form one aggregate, composite, and that, after the hardening of the plastic (11), the drain cover obtained (1) is removed from the mould (4).

The fibre strands (8), which form the reinforcement layers (7), are so arranged that each fibre strand (8) itself can come into contact with the injected plastic (11), and this with a determined outer layer surrounding the fibre strand (8), in this example D4 and D5, which are predetermined so that there is, on the one hand, a maximal bond between the fibres (9 and 9.1) located at the exterior perimeter of the fibre strands (8), and the injected plastic (11), and on the other hand, the aggregate, composite will provide the drain cover being made with sufficient stability to be able to handle the stated loads (P).

To obtain a supplementary bonding between the fibre strands (8) and the plastic (11), and also to connect the fibre strands (8) with each other via the plastic (11), the fibre strands (8) at the exterior perimeter are provided with a certain number of extending fibres (9.1) with a predetermined length (L) and that thus woven are located between the fibres (9) of the fibre strands (S) so that within the composite formed, all fibre strands (S) are attached to each other via the plastic (11) and additionally with the fibres (9.1).

To improve the interaction between the plastic (11) and the fibre strands (8) and in this way to strengthen the composite obtained, the invention provides for the connection of the ends of the fibre strands (8) with each other, for example, by forming a reinforcement layer (7) by one long fibre strand (8) that consists of straight and parallel fibre strands (8) as depicted in FIG. 11. It is evident from FIG. 11 that the fibre strand 8 includes bent portions 24 that define a transition of 180° between each parallel row.

As already mentioned, the invention concerns the fabrication of a drain cover (1), provided with the necessary reinforcement layers (7) that are laid on top of each other horizontally, sideways or at a certain angle, and composed of fibre strands (S) of a certain diameter (D2) that are straight, parallel and a certain distance (D1) from each other, the structure of which is composed of interwoven fibres (9) and fibres (9.1) so that the fibres (9 and 9.1) in the fibre-strands (8) interact as an aggregate within the composite formed when the fibre strands (S) are subject to loads, more specifically, the fibre strands (8) must have the function of full-fledged reinforcement bars that with their total diameter (D2) must be able to provide maximum support in predetermined directions within the composite constructed in this way.

In order to keep the fibre strands (8) straight, parallel and spaced at a certain distance (D1) in the reinforcement layers (7), one preferably can use plastic nets, spacers (18) that are sufficiently rigid and have a certain structure so that the respective distances (D1) necessary between the fibre strands (8) will be maintained during the filling of the mould (4) with liquid plastic (11). This reinforcement technique differs from all other methods of reinforcement because here there is not a total saturation of the required weave with which one wishes to reinforce the plastic slabs or plastic covers, and thus the thickness of the weave is limited; this invention provides for a process that makes possible the making of fibre strands (8) with a certain diameter (D2) made up by interweaving a certain number of fibres (9) or bundles of fibres (9) and fibres (9.1) as depicted in FIG. 8, which are able to function as full-fledged reinforcement bars in the making of a composite consisting of plastic and reinforcement fibres which does not require complete penetration to the centre of the fibre strands (S), but the bond between the plastic (11) and the fibre strands (8) is formed by the penetration of all the fibres (9 and 9.1) that appear at the exterior perimeter of the fibre strands (8).

The RIM procedure (Reaction Injection Moulding) is preferably used here as this offers the advantages mentioned in the introduction. Here, as indicated in FIGS. 3 and 4, two components are added to the mould (4), via pipes (12 and 13), that are combined in a mixer (14) immediately before they enter the mould (4) in order subsequently to be injected via a common pipe into the mould (4) in which the components of the mixture react with one another and form the final plastic (11). The component mixture is preferably injected relatively slowly into the mould (4) to avoid the reinforcing strands (8) and the spacers (18) shifting.

In order to obtain an optimum filling of the mould (4) and good contact with all fibres (9 and 9.1) of the fibre strands (8) of the reinforcement layers (7), the form (4) is positioned sloping upwards: the plastic supply occurs at the entrance (16) which is located at the lowest point of the mould (4) where the mould is divided, and the mould (4) is bled via an opening located above (17). The slope (A) is preferably 60°.

For the reinforced drain cover (1), the aforementioned components that are added according to the RIM procedure are preferably polyol and isocyanate.

As will be made clearer below using FIGS. 5 to 8, during the introduction of the aforementioned reinforcement layers (7) and the spacers (18), flow channels are provided. These are preferably made by using the spacers (18) that each consist of one or more layered elements (19 & 20) with a diagonal open structure, as for example depicted in FIG. 6, by which is intended that circulation is always possible along one or more diagonal directions (B and/or C). The making of the flow channels (23) is moreover helped by attaching the fibre strands (8) at a certain distance (D1) from each other, parallel and straight, to the spacers (18). It is necessary that the injected plastic (11) is forced to maximally circulate through all fibre strands (8) of the reinforcement layers (7) so that a predetermined outer layer forms around the fibre strands (8), in order that maximal contact and bonding occurs between all fibres (9 and 9.1) that appear at the exterior perimeter of all fibre strands (8) and the injected plastic (1), in order in this way to form a strong composite, to obtain a reinforced drain cover (1) able to handle predetermined loads (P).

Figure 6:
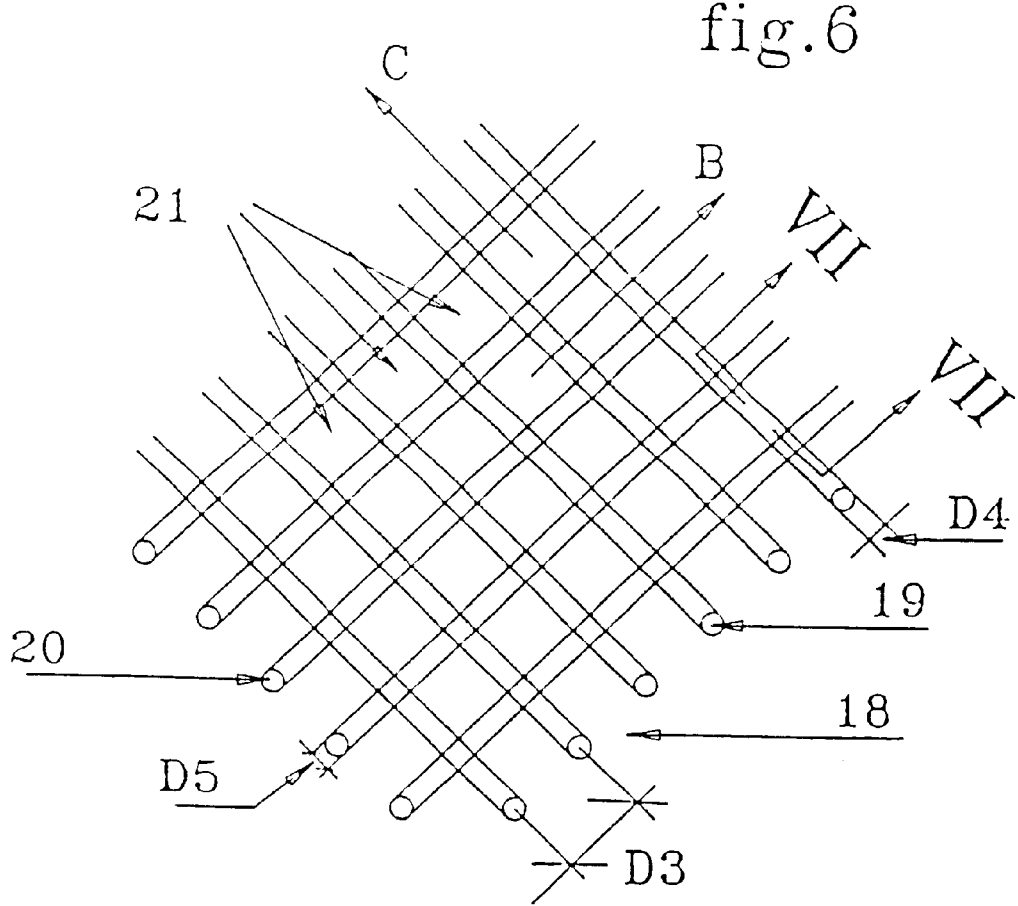
FIG. 6 depicts part of a spacer that is used for the drain cover in FIG. 1.
Figure 7:
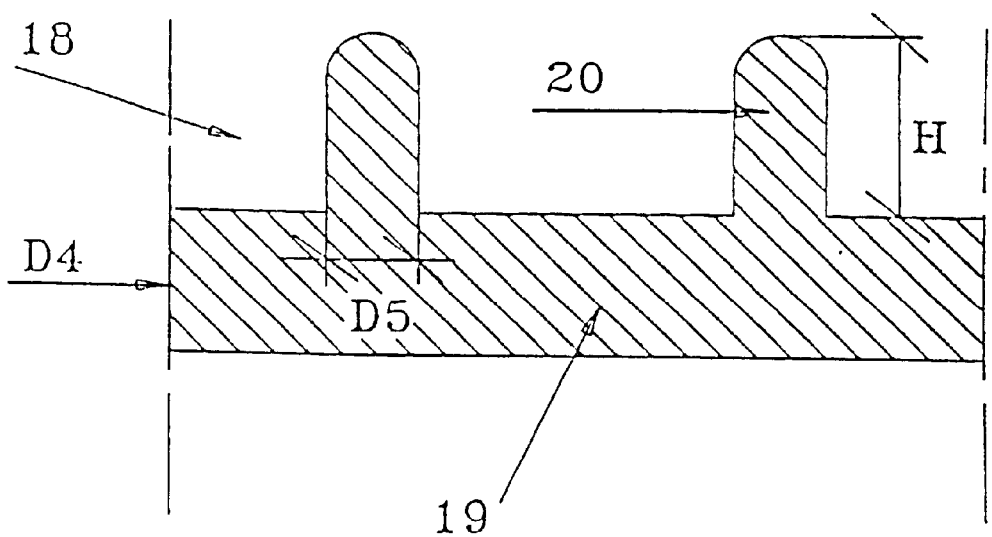
FIG. 7 depicts a larger scale and cross-section of line VII—VII in FIG. 6.

As depicted in FIG. 6, the spacers (18) in FIG. 6 consist preferably of plastic nets. in order to allow proper circulation of the plastic injected into the mould (11), use can be made of nets with rectangular or square mesh (21) with, for example, a core distance (D3) equal to 5 to 15 mm. In order to provide for the diagonal open structure, the nets are preferably made of threads (19 & 20) laid one upon the other that, as depicted in FIG. 7, are attached to each other, for example by being, partially melted together. The threads (19), for example, have a diameter (D4) of 2 to 6 mm, the threads (20) for example have a width (D5) which determines the distance (D1) between the fibre strands (8), and a height (H) allowing the fibre strands (8) to be attached, for example, by clamping the fibre strands (8) between the threads (20) of the spacers (18).

The attachment of the fibre strands (8) to the spacers (18) can also be done by stapling, sewing, gluing or melting the fibre strands (8) to the spacers (8).

Multiple reinforcement layers (7) can also be composed of fibre strands (8) that run parallel and a certain distance (D1) from each other, attached to each other crosswise or at a certain angle (E) without using spacers (18), as depicted in FIG. 10 with the understanding that a sufficiently open structure is obtained in all directions between all the fibre strands (8) that make up the reinforcement package so that the injected plastic (11) will surround all fibre strands (8) with a plastic layer of a predetermined thickness.

The fibre strands (8), which form the reinforcement layers (7), are so arranged that each fibre strand (8) itself can come into contact with the injected plastic (11), and this with a determined outer layer surrounding the fibre strand (8), in this example D4 and D5, which are predetermined so that there is, on the one hand, a maximal bond between the fibres (9 and 9.1) located at the exterior perimeter of the fibre strands (8), and the injected plastic (11), and on the other hand, the aggregate, composite will provide the drain cover being made with sufficient stability to be able handle the stated loads (P).

The elements are preferably also made of plastic in order to limit or eliminate completely the possibility of warping which could arise due to differences in the expansion coefficients.

Each of the aforementioned fibre strands (8) is made of interwoven fibres (9) or bundles of fibres (9), and fibres (9.1), a piece of which is depicted in figure 8, consisting of fibreglass, carbon fibres or any possible plastic fibre, or fibres that could be suitable for this procedure.

The reinforcement layers (7) as well as the spacers (18) are preferably provided over the complete or almost complete surface of the drain cover (1). The mould (4) is filled with reinforcement layers (7) and spacers (18) which, in turn, can be any gauge depending upon the size of the load (P) that the drain cover (1) must be able to handle. The fibre strands (8) that form the reinforcement layers (7) of the drain cover (1) must be located at predetermined locations in the mould (4). This means that the mould (4) is completely filled by reinforcement layers (7) and spacers (18) with the understanding that all fibre strands (8) and spacers (18) are located at their predetermined locations in the mould (4) in order to ensure the stability and flatness of the drain cover (1) being made, and to ensure that an optimal filling of the mould (4) with plastic (11) is possible.

Note that according to the invention, fibre strands (8) composed of the above described structure and spacers (18) are used that allow themselves to be combined with the injected plastic (11), so that the aggregate, composite, is very elastic, so that a load (P) on the drain cover (1), which would cause sagging, would result in practically no lasting warping and that the drain cover (1) returns to a flat condition after removal of the load (P).

It is clear that the invention also concerns drain covers or slabs characterised by a construction obtained by the aforementioned process.

The present invention is in no way limited. to the examples described and the ways of implementation depicted in the figures, but such processes for the fabrication of a drain cover and the drain cover fabricated according to this process, can be realised according to different variations without falling outside the framework of the invention.

What is claimed is:

1. A method of fabricating a composite drain cover, comprising the steps of:

inserting a plurality of reinforcement layers into a mold having a cavity, each of said reinforcement layers including a plurality of fiber strands, the plurality of said reinforcement layers being positioned by means of at least one layered spacer interposed between two adjacent reinforcement layers; and then injecting at least one unhardened polymer into the mold cavity to thereby surround said reinforcement layers with said polymer in the mold cavity; and then hardening the polymer to form said composite cover in said mold cavity, wherein at least one reinforcement layer includes a plurality of fiber portions connected to one another to define a single continuous fiber strand, said continuous fiber strand being positioned in the mold cavity in generally straight and parallel rows such that the continuous fiber strand is surrounded by the hardened polymer.

2. The method according to claim 1 wherein said polymer is injected into said mold cavity using a reaction injection molding process.

3. The method according to claim 2 wherein said reaction injection molding process includes injecting polyol and isocyanate polymers into said mold cavity.

4. The method according to claim 1 wherein flow channels are defined between the reinforcement layers when said fiber strands and said layered spacers are inserted into said mold cavity.

5. The method according to claim 1 wherein a layer construction of said reinforcement layers and corresponding layered spacers are selected on the basis of the shrinkage characteristics thereof.

6. The method according to claim 1 further comprising the step of positioning ends of said reinforcement layers and said layered spacers so as to be adjacent to the walls of the mold cavity prior to injecting said at least one polymer into said mold cavity.

7. The method according to claim 1 wherein a layer construction of said reinforcement layers and corresponding layered spacers are selected on the basis of the predetermined stability and flatness requirements for a drain cover.

8. The method according to claim 1 wherein the layered spacers and the plurality of fiber strands are configured within the mold cavity so as to create an open cell structure therein to permit penetration of said polymer with said reinforcement layers and said layered spacers.

9. The method according to claim 1 wherein each of said fiber strands include a plurality of interwoven fibers and a plurality of fibers partially extending from the periphery of the diameter of said fiber strands.

10. The method according to claim 1 wherein said interwoven fibers are confined within the diameter of each of said fiber strands.

11. The method according to claim 1 wherein each of said fiber strands include a plurality of fibers partially extending a predetermined length from the periphery of the diameter of said fiber strands.

12. The method according to claim 1 wherein said at least one polymer bonds to the periphery of said fiber strands such that fibers contained by said fiber strands extend along the length thereof to sustain a load applied to said drain cover.

13. The method according to claim 1 wherein said at least one polymer is circulated between the predetermined clearance defined between each of said fiber strands attached to one of said layered spacers.

14. The method according to claim 1 wherein each of said layered spacers include a plurality of elements extending therefrom such that said fiber strands are attached to said elements and spaced from one another by the predetermined clearance.

15. The method according to claim 1 wherein a means for attaching said fiber strands to said layered spacers is selected from the group of stapling, glueing and sewing.

16. The method according to claim 1 further comprising the steps of positioning fiber strands of one of said reinforcement layers relative to a corresponding one of said layered spacers, and partially melting said corresponding spacer to bond with said fiber strands prior to the injection of said at least one polymer.

17. The method according to claim 16 wherein said at least one polymer bonds to said fiber strands along the external periphery thereof.

18. The method according to claim 16 wherein said at least one polymer bonds to said fiber strands only along the external periphery thereof.

19. The method according to claim 1, wherein the continuous fiber strand has bent portions and extends from one edge to an opposed edge of the periphery of the mold cavity.

20. The method according to claim 19, wherein at least one reinforcement layer is formed of a single continuous fiber strand.

21. The method according to claim 1, wherein at least two reinforcement layers include a continuous fiber strand having bent portions, the two reinforcement layers being positioned in the mold cavity such that the continuous fiber strand of one of the at least two reinforcement layers is positioned in a crosswise direction in relation to the continuous fiber strand-of another of the at least two reinforcement layers.

22. The method according to claim 21, wherein the at least two reinforcement layers are arranged above one another in crosswise directions.

23. The method according to claim 1, wherein the continuous fiber strand bends at 180° as it transitions between each of the parallel rows.

* * * * *